(12) United States Patent
Nakamura et al.

(10) Patent No.: US 11,919,541 B2
(45) Date of Patent: Mar. 5, 2024

(54) PICK-UP AND DROP-OFF DEVICE AND METHOD FOR AUTOMATED DRIVING VEHICLE

(71) Applicant: Toyota Jidosha Kabushiki Kaisha, Toyota Aichi-ken (JP)

(72) Inventors: Hiroshi Nakamura, Tokyo (JP);
Akihide Tachibana, Tokyo (JP);
Katsuhiro Sakai, Kawasaki (JP);
Kentaro Ichikawa, Shizuoka-ken (JP);
Taisuke Sugaiwa, Tokyo (JP)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 255 days.

(21) Appl. No.: 17/234,000

(22) Filed: Apr. 19, 2021

(65) Prior Publication Data

US 2021/0347385 A1    Nov. 11, 2021

(30) Foreign Application Priority Data

May 7, 2020    (JP) ................................. 2020-082126

(51) Int. Cl.
| | | |
|---|---|---|
| G01C 21/34 | (2006.01) | |
| B60W 30/06 | (2006.01) | |
| B60W 60/00 | (2020.01) | |
| G05D 1/00 | (2006.01) | |
| G08G 1/00 | (2006.01) | |
| G08G 1/14 | (2006.01) | |
| G08G 1/16 | (2006.01) | |

(52) U.S. Cl.
CPC ..... *B60W 60/00253* (2020.02); *G05D 1/0088* (2013.01); *B60W 2540/041* (2020.02)

(58) Field of Classification Search
CPC ...... B60W 60/00253; B60W 2540/041; G05D 1/0088
See application file for complete search history.

(56) References Cited

U.S. PATENT DOCUMENTS

| | | |
|---|---|---|
| 9,944,283 B2 | 4/2018 | Kindo et al. |
| 10,401,868 B2 | 9/2019 | Urano et al. |
| 10,464,556 B2 | 11/2019 | Sakuma et al. |
| 10,539,962 B2 | 1/2020 | Sogen et al. |

(Continued)

FOREIGN PATENT DOCUMENTS

JP    2019-168370 A    10/2019

*Primary Examiner* — Jess Whittington
*Assistant Examiner* — Rami Nabih Bedewi
(74) *Attorney, Agent, or Firm* — Dinsmore & Shohl LLP

(57) ABSTRACT

Automated drive system comprises a control device. The control device executes run control processing of the automated drive vehicle provided to a driverless transportation service. The run control processing includes carriage porch control processing. The carriage porch control processing is performed when a PUDO position of a user corresponds to a carriage porch of a facility including a zone for run and a zone for PUDO. In the carriage porch control processing, it is judged whether or not there is an empty space in the zone for PUDO. If it is judged that there is no empty space, it is judged whether or not a quick PUDO of the user in the carriage porch is expected. If it is judged that the quick PUDO is expected, a target PUDO position to perform a PUDO action of the automated drive vehicle is set to any position in the zone for run.

18 Claims, 17 Drawing Sheets

(56) References Cited

U.S. PATENT DOCUMENTS

| | | | |
|---|---|---|---|
| 10,656,651 | B2 | 5/2020 | Ozawa et al. |
| 10,789,848 | B2 | 9/2020 | Altintas et al. |
| 11,054,823 | B2 | 7/2021 | Hashimoto et al. |
| 11,085,779 | B2 | 8/2021 | Urano et al. |
| 11,144,073 | B2 | 10/2021 | Kanehara et al. |
| 11,220,262 | B2 | 1/2022 | Sone et al. |
| 11,262,755 | B2 | 3/2022 | Toyoda |
| 11,281,215 | B2 | 3/2022 | Yoshizaki et al. |
| 2018/0211541 | A1* | 7/2018 | Rakah .................... G08G 1/148 |
| 2018/0338229 | A1* | 11/2018 | Nemec .................... H04W 4/40 |
| 2018/0357906 | A1* | 12/2018 | Yaldo ................ B62D 15/0285 |
| 2019/0244317 | A1* | 8/2019 | Seki ...................... H04W 4/021 |
| 2019/0295413 | A1 | 9/2019 | Hase et al. |
| 2020/0111370 | A1* | 4/2020 | Dyer .................... G05D 1/0214 |
| 2020/0207349 | A1* | 7/2020 | Mimura ............... G05D 1/0088 |
| 2020/0307514 | A1* | 10/2020 | Yamane ................ G08G 1/146 |
| 2021/0097866 | A1* | 4/2021 | Leary .................... G08G 1/202 |

\* cited by examiner

PICK-UP AND DROP-OFF DEVICE AND METHOD FOR AUTOMATED DRIVING VEHICLE

CROSS-REFERENCE TO RELATED APPLICATION

The present application claims priority under 35 U.S.C. § 119 to Japanese Patent Application No. 2020-082126, filed May 7, 2020, the contents of which application are incorporated herein by reference in their entirety.

TECHNICAL FIELD

Present disclosure relates to a system and a method to control an automated drive vehicle.

BACKGROUND

JP2019-168370A disclose a system to control an automated drive vehicle. This conventional system detects whether or not the automated drive vehicle is able to stop at a destination when the vehicle reaches a vicinity of the destination. Then, if it is detected that the automated drive vehicle is unable to stop at the destination, the system changes a stopping position of the vehicle to a position other than the destination.

SUMMARY

Consider a case where the destination is a facility such as a hotel, a building, an airport, etc. Such a facility is usually provided with a carriage porch. If the facility is provided with the carriage porch, it is conceivable that automated drive vehicle stops in a zone for pick up and/or drop off in the carriage porch. In the following explanation, the wording "pick up and/or drop off" is also referred to as "PUDO".

The area of the zone for PUDO is limited. Therefore, when the automated drive vehicle reaches the entrance of the carriage porch, the following is assumed. That is, it turns out that the zone for PUDO is filled with other vehicles and there is no empty space. In this case, to perform a PUDO action in a zone different from the zone for PUDO may obstruct a passage of other vehicle and a walker.

One objective of the present disclosure is to provide a technique that enables the PUDO action of the automated drive vehicle without obstructing the passage of the other vehicle or the walker when there is no empty space in the zone for PUDO.

A first aspect is an automated drive system that is configured to control an automated drive vehicle provided to a driverless transportation service and has the following features.

The automated drive system comprises an information acquisition device and a control device.

The information acquisition device is configured to obtain user information and driving environment information. The user information indicates information on a user of the driverless transportation service. The driving environment information indicates information on driving environment of the automated drive vehicle.

The control device is configured to perform run control processing of the automated drive vehicle based on the user information and the driving environment information.

The run control processing includes carriage porch control processing. The carriage porch control processing is performed when a pick up and/or drop off position of the user corresponds to a carriage porch of a facility including a zone for run and a zone for pick-up and/or drop-off.

In the carriage porch control processing, the control device is configured to:
    judge whether or not the zone for pick-up and/or drop-off has an empty space;
    if it is judged that there is no empty space, based on the user information, judge whether or not a quick pick-up and/or drop-off in the carriage porch of the user is expected; and
    if it is judged that the quick pick-up and/or drop-off is expected, set a target pick-up and/or drop-off position to perform a pick-up and/or drop-off action of the automated drive vehicle at any position within the zone for run.

A second aspect further has the following feature in the first aspect.

In the carriage porch control processing, the control device is further configured to, if it is judged that the quick pick-up and/or drop-off is not expected, set a target waiting position for waiting for the pick-up and/or drop-off action of the automated drive vehicle within the zone for run. The target waiting position locates at an upstream of a lateral position of a stopping vehicle stopping at a last position of the zone for pick-up and/or drop-off.

A third aspect further has the following features in the second aspect.

In the carriage porch control processing, the control device is further configured to:
    judge, based on the driving environment information, whether or not the pick-up and/or drop-off action of the stopping vehicle is expected to be ended; and
    if it is judged that a pick-up and/or drop-off action of a stopping vehicle stopping in the zone for pick-up and/or drop-off is expected to be ended, change the target waiting position to a positon near a lateral position of the stopping vehicle and an upstream of the same lateral position.

A fourth aspect further has the following features in the first aspect.

In the carriage porch control processing, the control device is further configured to:
    if it is judged that the quick pick-up and/or drop-off is not expected, based on the driving environment information, judge whether or not a pick-up and/or drop-off action of a stopping vehicle stopping in the zone for pick-up and/or drop-off is expected to be ended; and
    if it is judged that the pick-up and/or drop-off action of the stopping vehicle is expected to be ended, set a target waiting position for waiting for the pick-up and/or drop-off action of the automated drive vehicle within the zone for run. The target waiting position locates near a lateral position of the stopping vehicle and an upstream of the same lateral position.

A fifth aspect further has the following features in the second aspect.

In the carriage porch control processing, the control device is further configured to:
    after the setting of the target waiting position, based on the driving environment information, judge whether or not an approaching motion of a following vehicle of the automated drive vehicle to the zone for run is recognized; and
    if it is judged that the approaching motion is recognized, set a travel route for temporarily passing through the carriage porch and returning to the carriage porch.

A sixth aspect further has the following features in the second aspect.

In the carriage porch control processing, the control device is further configured to:
- after the setting of the target waiting position, based on the driving environment information, judge whether or not an approaching motion of a following vehicle of the automated drive vehicle to the zone for run is recognized;
- if it is judged that the approaching motion is recognized, judge whether or not a short waiting of the automated drive vehicle in the target waiting position is expected; and
- if it is judged that the short waiting is expected, retain the target waiting position.

A seventh aspect further has the following feature in the sixth aspect.

In the carriage porch control processing, the control device is further configured to, if it is judged that the short waiting is not expected, set a travel route for temporarily passing through the carriage porch and returning to the carriage porch.

An eighth aspect further has the following feature in the first aspect.

The target pick-up and/or drop-off position is a position closest to a doorway of the facility leading to the zone for pick-up and/or drop-off.

A ninth aspect further has the following feature in the first aspect.

The target pick-up and/or drop-off position is an intermediate of lateral positions of adjacent stopping vehicles, each of which stops at the zone for pick-up and/or drop-off.

A tenth aspect is an automated driving method to control an automated drive vehicle provided to a driverless transportation service and has the following features.

The automated driving method comprising the steps of:
- obtaining user information indicating information on a user of the driverless transportation service and driving environment information indicating information on driving environment of the automated drive vehicle; and
- executing run control processing of the automated drive vehicle based on the user information and the driving environment information.

The run control processing includes carriage porch control processing that is executed when a pick up and/or drop off position of the user corresponds to a carriage porch of a facility including a zone for run and a zone for pick-up and/or drop-off.

The carriage porch control processing includes the steps of:
- judging whether or not the zone for pick-up and/or drop-off has an empty space;
- if it is judged that there is no empty space, based on the user information, judging whether or not a quick pick-up and/or drop-off in the carriage porch of the user is expected; and
- if it is judged that the quick pick-up and/or drop-off is expected, setting a target pick-up and/or drop-off position to perform a pick-up and/or drop-off action of the automated drive vehicle at any position within the zone for run.

An eleventh aspect further has the following feature in the tenth aspect.

The carriage porch control processing further includes the step of, if it is judged that the quick pick-up and/or drop-off is not expected, setting a target waiting position for waiting for the pick-up and/or drop-off action of the automated drive vehicle within the zone for run. The target waiting position locates at an upstream of a lateral position of a stopping vehicle stopping at a last position of the zone for pick-up and/or drop-off.

A twelfth aspect further has the following features in the eleventh aspect.

The carriage porch control processing further includes the steps of:
- judging, based on the driving environment information, whether or not then a pick-up and/or drop-off action of a stopping vehicle stopping in the zone for pick-up and/or drop-off is expected to be ended; and
- if it is judged that the pick-up and/or drop-off action of the stopping vehicle is expected to be ended, changing the target waiting position to a positon near a lateral position of the stopping vehicle and an upstream of the same lateral position.

A thirteenth aspect further has the following features in the tenth aspect.

The carriage porch control processing further includes the steps of:
- if it is judged that the quick pick-up and/or drop-off is not expected, based on the driving environment information, judging whether or not a pick-up and/or drop-off action of a stopping vehicle stopping in the zone for pick-up and/or drop-off is expected to be ended; and
- if it is judged that the pick-up and/or drop-off action of the stopping vehicle is expected to be ended, setting a target waiting position for waiting for the pick-up and/or drop-off action of the automated drive vehicle within the zone for run. The target waiting position locates near a lateral position of the stopping vehicle and an upstream of the same lateral position.

A fourteenth aspect further has the following features in the eleventh aspect.

The carriage porch control processing further includes the steps of:
- after the setting of the target waiting position, based on the driving environment information, judging whether or not an approaching motion of a following vehicle of the automated drive vehicle to the zone for run is recognized; and
- if it is judged that the approaching motion is recognized, setting a travel route for temporarily passing through the carriage porch and returning to the carriage porch.

A fifteenth aspect further has the following features in the eleventh aspect.

The carriage porch control processing further includes the steps of:
- after the setting of the target waiting position, based on the driving environment information, judging whether or not an approaching motion of a following vehicle of the automated drive vehicle to the zone for run is recognized;
- if it is judged that the approaching motion is recognized, judging whether or not a short waiting of the automated drive vehicle in the target waiting position is expected; and
- if it is judged that the short waiting is expected, retaining the target waiting position.

A sixteenth aspect further has the following feature in the fifteenth aspect.

The carriage porch control processing further includes the step of, if it is judged that the short waiting is not expected, setting a travel route for temporarily passing through the carriage porch and returning to the carriage porch.

A seventeenth aspect further has the following feature in the tenth aspect.

The target pick-up and/or drop-off position is a position closest to a doorway of the facility leading to the zone for pick-up and/or drop-off.

An eighteenth aspect further has the following feature in the tenth aspect.

The target pick-up and/or drop-off position is an intermediate of lateral positions of adjacent stopping vehicles, each of which stops at the zone for pick-up and/or drop-off.

According to the first or tenth aspect, even if there is no empty space in the zone for pick-up and/or drop-off, if the quick pick-up and/or drop-off is expected, the target the target pick-up and/or drop-off position for the PUDO action of the automated drive vehicle is set to any position within the zone for run. Therefore, it is possible to perform the PUDO action while avoiding the situation in which the passage of the other vehicle or the walker in the carriage porch is obstructed.

According to the second or eleventh aspect, when the quick pick-up and/or drop-off of the user is not expected, the target waiting position for waiting for the PUDO action of the automated drive vehicle is set within the zone for run. The target waiting position locates at an upstream of a lateral position of a stopping vehicle stopping at a last position of the zone for pick-up and/or drop-off. Therefore, it is possible for the automated drive vehicle to wait until the empty space comes out in the zone for pick-up and/or drop-off without being stuck in an entrance of the carriage porch.

According to the third or twelfth aspect, when the pick-up and/or drop-off action of the stopping vehicle is expected to be ended, the target waiting position is changed to a positon near a lateral position of the stopping vehicle and an upstream of the same lateral position. Therefore, it is possible to start the PUDO action of the automated drive vehicle immediately after a start of the stopping vehicle and complete the PUDO action earlier.

According to the fourth or thirteen aspect, when the pick-up and/or drop-off action of the stopping vehicle is expected to be ended, the target waiting position is set to a positon near a lateral position of the stopping vehicle and an upstream of the same lateral position. Therefore, it is possible to obtain the same effect as the third or twelfth aspect.

According to the fifth or fourteenth aspect, when the approaching motion is recognized after the setting of the target waiting position, a travel route for temporarily passing through the carriage porch and returning to the carriage porch is set. Therefore, it is possible for the automated drive vehicle to wait until the empty space comes out of the zone for pick-up and/or drop-off while avoiding a situation in which a passage of the following vehicle approaching the zone for run is obstructed.

According to the sixth or fifteenth aspect, even when the approaching motion of the following vehicle to the zone for run is recognized, the target waiting position is retained when the short waiting is expected. Therefore, it is possible for the automated drive vehicle to wait until the empty space comes out of the zone for pick-up and/or drop-off while minimizing the situation in which the passage of the following vehicle approaching the zone for run is obstructed.

According to the seventh or sixteenth aspect, when the approaching motion of the following vehicle to the zone for run is recognized and the short waiting is not expected, a travel route for temporarily passing through the carriage porch and returning to the carriage porch is set. Therefore, it is possible to obtain the same effect as the fifth or fourteenth aspect.

According to the eighth or seventeenth aspect, since the target pick-up and/or drop-off position is set at the position closest to the doorway of the facility leading to the zone for pick-up and/or drop-off, a distance from the target pick-up and/or drop-off position to the doorway becomes shortest. Therefore, it is possible to minimize a burden of moving the user due to the PUDO action in the zone for run.

According to the ninth or eighteenth aspect, since the target pick-up and/or drop-off position is set in the intermediate of the lateral positions of the adjacent stopping vehicles stopped in the zone for pick-up and/or drop-off, a moving distance by the user from the target pick-up and/or drop-off position to the zone for pick-up and/or drop-off becomes short. Therefore, it is possible to ensure the safety of the user associated with the PUDO action in zone for run.

DESCRIPTION OF EMBODIMENTS

Hereinafter, embodiments of the present disclosure will be described with reference to the attached drawings.

1. First Embodiment

First, a first embodiment of the present disclosure will be explained with reference to FIGS. 1 to 8. Automated driving method according to first embodiment is realized by automated drive system according to first embodiment.

1-1. Outline

1-1-1. Driverless Transportation Service

Figure 1:
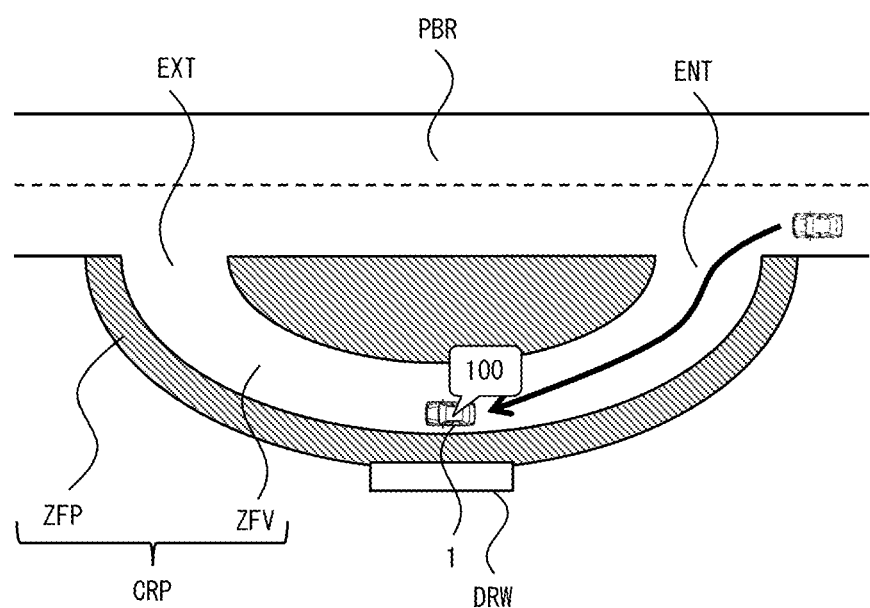
FIG. 1 is a diagram for explaining an outline of a driverless transportation service.

FIG. 1 is a diagram for explaining an outline of a driverless transportation service. An automated drive vehicle 1 shown in FIG. 1 is configured to run autonomously in a travel route from a start point to a destination of the automated drive vehicle 1, regardless of driving operations by a driver. Examples of the automated drive vehicle 1 include unmanned taxis and unmanned buses.

In the present disclosure, it is assumed that destination of the automated drive vehicle 1 corresponds to a facility including a carriage porch CRP. Examples of such facility include a hotel, a building, a station and an airport. The carriage porch CRP is equipped with an entrance ENT and an exit EXT leading to a public road PBR. The carriage porch CRP is one-way. That is, a travel direction of a vehicle (all vehicles including the automated drive vehicle 1) in the carriage porch CRP is predetermined. From a viewpoint of the travel direction, an "upstream" and a "downstream" in the carriage porch CRP are defined.

Figure 2:
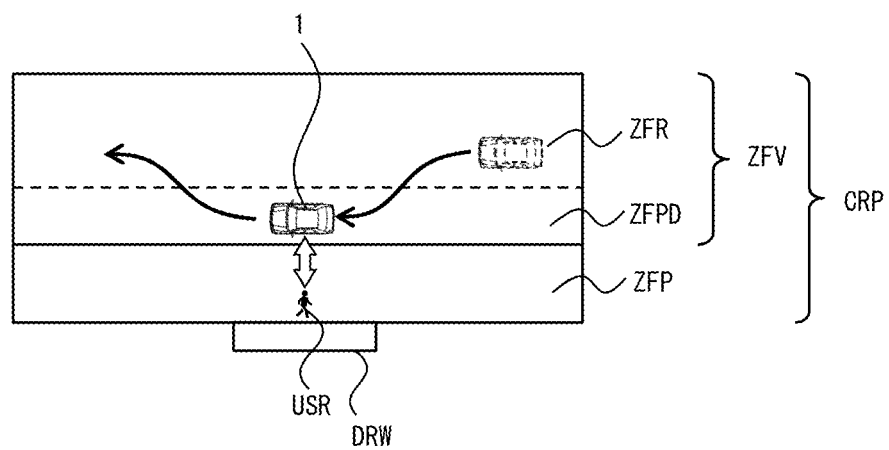
FIG. 2 is a diagram for explaining the PUDO action in the driverless transportation service.

FIG. 2 is a diagram for explaining the PUDO action in the driverless transportation service. The carriage porch CRP is roughly divided into a zone for vehicle ZFV and a zone for pedestrian ZFP. The zone ZFP is formed at a higher position than the zone ZFV, by which a boundary between them are clearly distinguished. The zone ZFV includes a zone for run ZFR (Zone for run) and a zone for PUDO ZFPD. An example of a boundary between the zones ZFR and ZFPD is shown in broken line in FIG. 2. However, the boundary need not be drawn on a road surface of the carriage porch CRP. In this case, the zones ZFR and ZFPD are defined with reference to the position of the boundary between them.

In the driverless transportation service, the PUDO action is performed at a position close to a doorway DRW of the facility, as in the typical transport services. The PUDO action is performed at least at any position within the zone ZFPD. Control of the automated drive vehicle 1 related to the PUDO action is performed according to "carriage porch control processing". The carriage porch control processing is executed as part of "run control processing". The run control processing is processing executed by the automated drive vehicle 1 to autonomously run a travel route from a start point to a destination. If the destination of the automated drive vehicle 1 is a facility provided with the carriage porch CRP, the "run control processing" is executed in the travel route on a public route PBR from the start point to the entrance ENT. After the automated drive vehicle 1 reaches the entrance ENT, the "carriage porch control processing" is executed.

If a pickup point of the user USR corresponds to the facility provided with the carriage porch CRP, a pickup action is performed at any position in the zone ZFPD. The automated drive vehicle 1 then starts to a drop-off point of the user USR. If the drop-off point of the user USR corresponds to another facility with the carriage porch CRP, a drop-off action is performed at any position in the zone ZFPD. The automated drive vehicle 1 then starts to another destination (e.g., another pickup point of another user USR, a standby point of the driverless transportation service). During the stop of the automated drive vehicle 1, the drop-off action of a user USR and the pickup action of another user USR may be performed continuously.

The automated drive system 100 shown in FIG. 1 controls the automated drive vehicle 1. Typically, the automated drive system 100 is mounted on the automated drive vehicle 1. Part of functions of the automated drive system 100 may be located external to the automated drive vehicle 1, so that the control of the automated drive vehicle 1 may be executed remotely.

The automated drive system 100 controls the automated drive vehicle 1 such that the vehicle 1 moves from the entrance ENT to the zone ZFV. The automated drive system 100 also controls the automated drive vehicle 1 such that the vehicle stops at the zone ZFPD. When the automated drive vehicle 1 stops, the automated drive system 100 opens a door of the automated drive vehicle 1. Then, the user USR gets off the automated drive vehicle 1 or gets into the automated drive vehicle 1. Then, the automated drive system 100 closes the door of the automated drive vehicle 1. The automated drive system 100 then controls the automated drive vehicle 1 such that the vehicle 1 go out of the zone ZFV to the exit EXT.

1-1-2. Characteristics of First Embodiment

Figure 3:
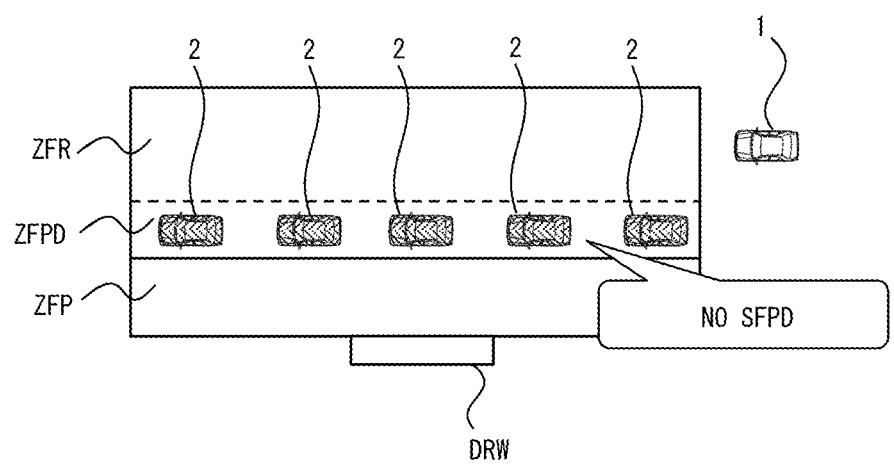
FIG. 3 is a diagram for explaining characteristics of the first embodiment.
Figure 4:
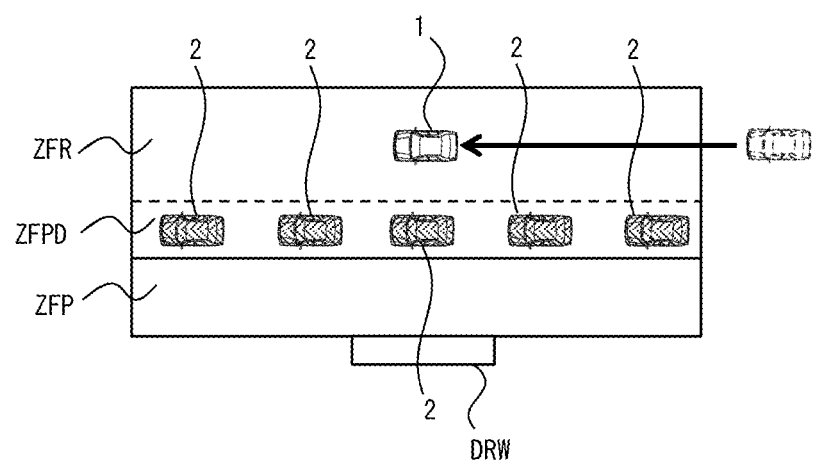
FIG. 4 is a diagram for explaining the characteristics of the first embodiment.
Figure 5:
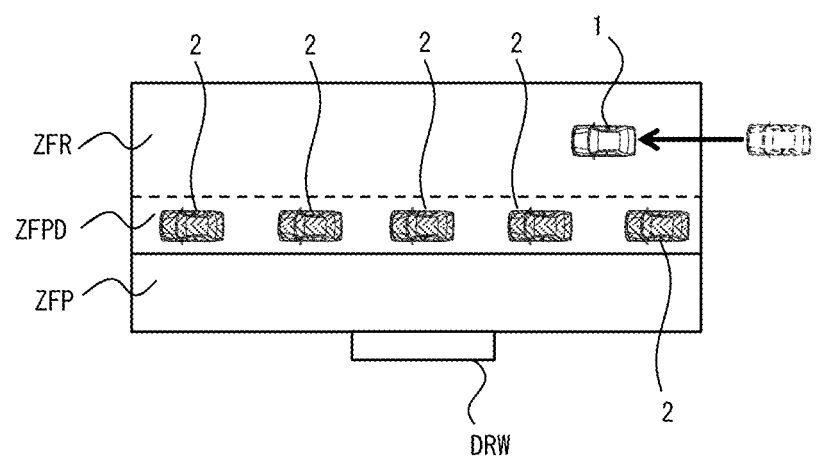
FIG. 5 is a diagram for explaining the characteristics of the first embodiment.

FIGS. 3 to 5 are diagrams for explaining characteristics of the first embodiment. The PUDO action described in FIG. 2 assumes that an empty space SFPD is present in the zone ZFPD. However, since area of the carriage porch CRP is limited, it is assumed that the zone ZFPD is filled with stopping vehicles 2. It is also assumed that the zone ZFPD is filled with the stopping vehicles 2 during hours when visitors to the facility are concentrated. In such cases, it is difficult to perform the PUDO action by the automated drive vehicle 1 as usual.

Therefore, in the first embodiment, it is judged in the carriage porch control processing whether or not the zone ZFPD is filled with the stopping vehicles 2 when the automated drive vehicle 1 reaches the entrance ENT. Then, if it is judged that the zone ZFPD is filled with the stopping vehicles 2, it is judged whether or not a quick PUDO is expected. The "quick PUDO" means that a duration of the PUDO action of the automated drive vehicle 1 ends in a short time. The duration is calculated based on information on the user USR (hereinafter also referred to as "user information").

In the carriage porch control processing, if it is judged that the quick PUDO is expected, a target position TSPD at which the PUDO action of the automated drive vehicle 1 is performed is set to any position in the zone ZFR. If the target position TSPD is set, the automated drive vehicle 1 stops at the target position TSPD and perform the PUDO action.

FIG. 4 is a diagram for explaining a first setting example of the target position TSPD. In the example shown in FIG. 4, the target position TSPD is set at a position closest to the doorway DRW. By setting the target position TSPD at such a position, a distance from the position where the PUDO action of the automated drive vehicle 1 is performed to the doorway DRW is shortest. Therefore, it is possible to minimize a burden of moving the user due to the quick PUDO.

FIG. 5 is a diagram for explaining a second setting example of the target position TSPD. In the example shown in FIG. 5, the target position TSPD is set in an intermediate of lateral positions of adjacent two stopping vehicles 2. By setting the target position TSPD at such an intermediate position, a movement distance of the user USR from the position where the PUDO action of the automated drive vehicle 1 is performed to the zone ZFPD is shortened.

Therefore, it is possible to ensure the safety of the user USR associated with the quick PUDO.

1-2. Automated Drive System

1-2-1. Configuration Example

Figure 6:
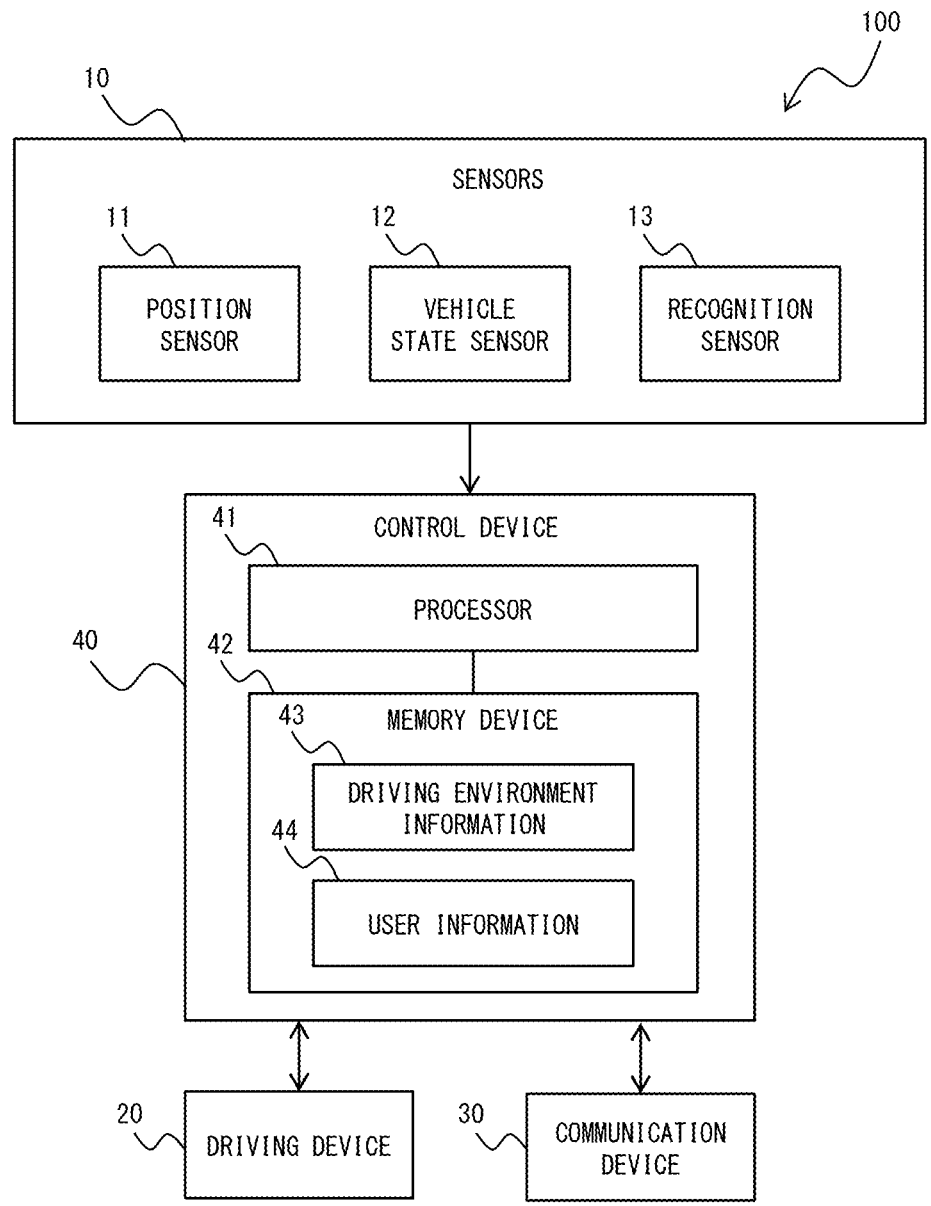
FIG. 6 is a diagram showing a configuration example of an automated drive system.

FIG. 6 is a diagram showing a configuration example of the automated drive system 100. As shown in FIG. 6, the automated drive system 100 includes sensors 10, a driving device 20, a communication device 30 and a control device 40.

The sensors 10 are mounted on the automated drive vehicle 1. The sensors 10 includes a position sensor 11, a vehicle state sensor 12 and a recognition sensor 13. The position sensor 11 detects a position and an orientation of the automated drive vehicle 1. Examples of the position sensor 11 include a GPS (Global Positioning System) sensor. The vehicle state sensor 12 detects status of the automated drive vehicle 1. Examples of the vehicle state sensor 12 include a vehicle speed sensor, a yaw rate sensor, a lateral acceleration sensor, and a steering angle sensor. The recognition sensor 13 recognizes (or detects) surrounding circumstances of the automated drive vehicle 1. Examples of the recognition sensor 13 include a camera, a radar, and a LiDAR (Laser imaging detection and ranging).

The driving device 20 is mounted on the automated drive vehicle 1. The driving device 20 includes steering, driving and braking devices. The steering device steers wheels of the automated drive vehicle 1. For example, the steering system includes an EPS (Electric Power Steering) system. The driving device is a power source that generates a driving force. Examples of the driving device include an engine, an electric motor and an in-wheel motor. The braking device generates a braking force.

The communication device 30 communicates with outside of the automated drive system 100. For example, the communication device 30 communicates a management server which manages the driverless transportation service. As another example, the communication device 30 communicates with a terminal (e.g., a smart phone, a tablet, a personal computer) owned by the user USR.

The control device 40 controls the automated drive vehicle 1. Typically, the control device 40 is a microcomputer mounted on the automated drive vehicle 1. The control device 40 is also referred to as an ECU (Electronic Control Unit). The control device 40 may be an information processing device external to the automated drive vehicle 1. In this case, the control device 40 communicates with the automated drive vehicle 1 and remotely controls the automated drive vehicle 1.

The control device 40 includes a processor 41 and a memory device 42. The processor 41 performs various processing. The memory device 42 stores various information. Examples of the memory device 42 include a volatile memory and a nonvolatile memory. Various processing by the processor 41 (the control device 40) is realized when the processor 41 executes a control program as a computer program. The control program is stored in the memory device 42 or recorded on a computer-readable recording medium.

The processor 41 executes the run control processing. The run control processing includes steering control processing, acceleration control processing, and deceleration control processing. The processor 41 controls the driving device 20 by executing the run control processing. Specifically, the processor 41 controls the steering device by executing the steering control processing. The processor 41 controls the driving device by executing the acceleration control processing. The processor 41 controls the braking device by executing the deceleration control processing.

The processor 41 also acquires driving environment information 43 indicating driving environment of the automated drive vehicle 1. The driving environment information 43 is obtained based on results detected by the sensors 10. The acquired driving environment information 43 is stored in the memory device 42.

Figure 7:
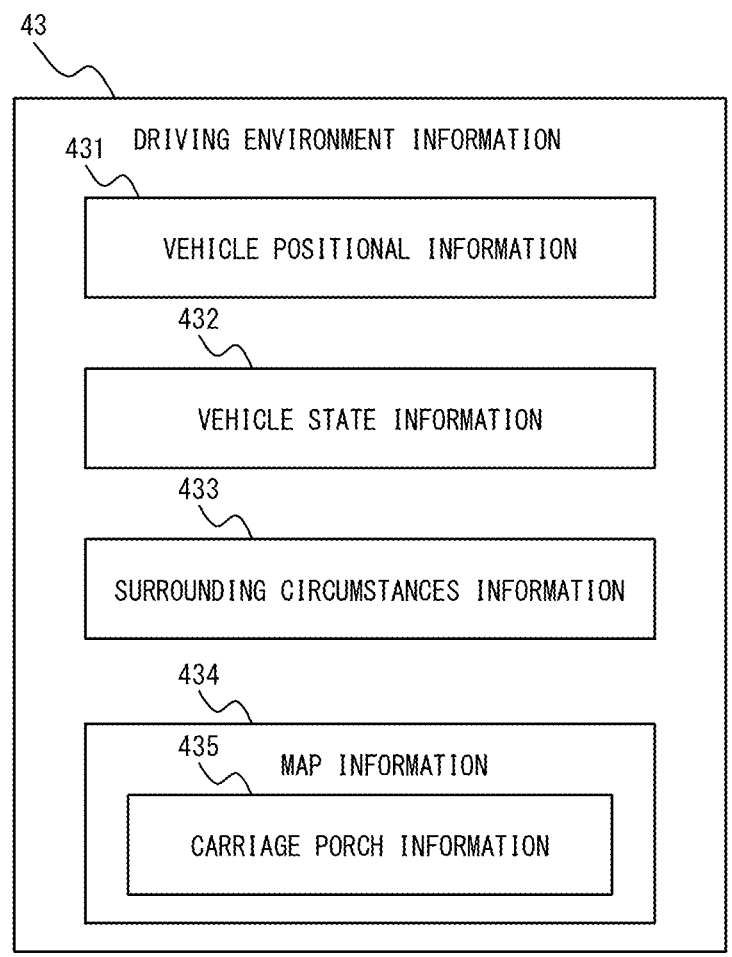
FIG. 7 is a block-diagram of an example of driving environment information.

FIG. 7 is a block-diagram of an example of the driving environment information 43. As shown in FIG. 7, the driving environment information 43 includes vehicle positional information 431, vehicle state information 432, surrounding circumstances information 433 and map information 434.

The vehicle positional information 431 is information indicating the position and orientation of the automated drive vehicle 1 in an absolute coordinate system. The processor 41 acquires the vehicle positional information 431 from a detection result by the position sensor 11. The processor 41 may also obtain more accurate vehicle positional information 431 by well-known localization.

The vehicle state information 432 is information indicating the status of the automated drive vehicle 1. Examples of the status of the automated drive vehicle 1 include vehicle speed, yaw rate, lateral acceleration and steering angle. The processor 41 acquires the vehicle state information 432 from a detection result by the vehicle state sensor 12.

The surrounding circumstances information 433 is information indicating surrounding circumstances of the automated drive vehicle 1. The surrounding circumstances information 433 includes information obtained by the recognition sensor 13. For example, the surrounding circumstances information 433 may include image information indicating the surrounding conditions of the automated drive vehicle 1 imaged by the camera. Alternatively, the surrounding circumstances information 433 includes measuring information measured by the radar or the LiDAR. In addition, the surrounding circumstances information 433 includes object information on an object around the automated drive vehicle 1. Examples of the object around the automated drive vehicle 1 include other vehicle, a walker, a mark, a white lane, and a roadside structure (e.g., a guard rail and a curb). The object information indicates relative position of the object to automated drive vehicle 1. For example, by analyzing the image information obtained by the camera, the object can be identified and its relative position can be calculated. It is also possible to identify the object and its relative position based on radar measurement information.

The map information 434 is information indicating a lane arrangement and a road shape. The map information 434 includes common navigational maps. The processor 41 obtains the map information 434 of a necessary area for the processor 41 from a map database. The map database may be stored in a predetermined memory device mounted on the automated drive vehicle 1, or may be stored in the management server external to the automated drive vehicle 1. In the latter case, the processor 41 communicates with the management server via the communication device 30 to obtain the necessary map information 434.

The carriage porch information 435 is information indicating a structure, a position and a range of the carriage porch CRP. For example, the carriage porch information 435 is registered in advance in the map database. In another example, the carriage porch information 435 may be provided from the facility when the automated drive vehicle 1 approaches the facility. In this case, the processor 41 communicates with the facility over the communication device 30 to obtain the carriage porch information 435 of the facility. Although an actual carriage porch CRP may not be clearly recognized by the automated drive vehicle 1, the structure, position, and range of the carriage porch CRP are clearly defined on the map data.

Return to FIG. 6 and continue to explain the configuration example of the automated drive system 100. The processor 41 obtains the user information 44 on the user USR who wishes to utilize the driverless transportation service. The user information 44 is provided by the management server via the communication device 30. The obtained user information 44 is stored in the memory device 42.

Figure 8:
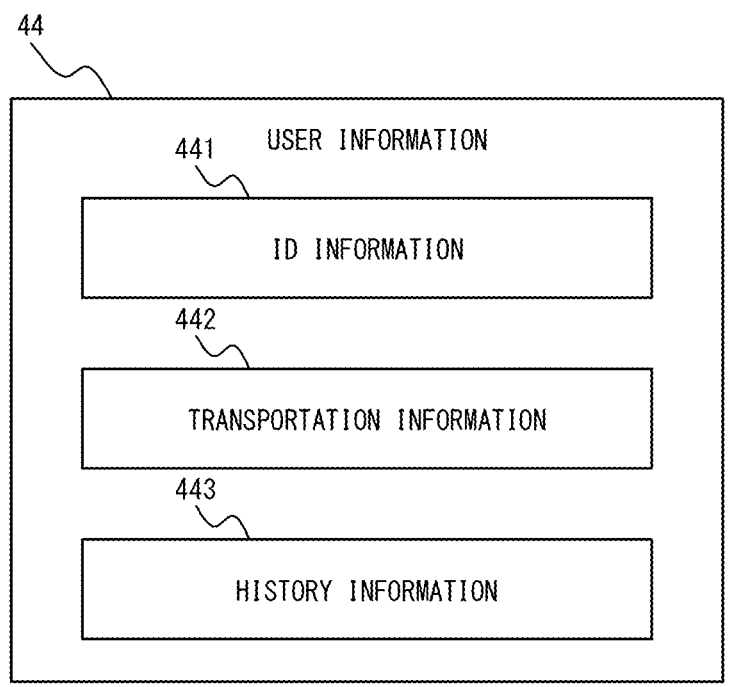
FIG. 8 is a block-diagram of an example of user information.

FIG. 8 is a block-diagram of an example of the user information 44. As shown in FIG. 8, the user information 44 includes ID information 441, transportation information 442 and history information 443.

The ID information 441 is information registered in the management server that is used in the driverless transportation service. The ID information 441 includes personal data and face photo data of the user USR. The personal data includes identification number data and priority-seat condition data (e.g., elderly, pregnant women, accompanied infants and disabled persons) of the user USR. The data of the identification number and face photo is used for a user authentication by the management server or the automated drive vehicle 1. The priority-seat condition data is used for a chance judgment of the quick PUDO. The chance judgment will be described later.

The transportation information 442 is information that is transmitted from the user USR to the management server when the user USR uses the driverless transportation service. The transportation information 442 includes data pf the pickup point and the drop-off point. The transportation information 442 also includes data of pickup time. The data of the pickup point may be specified from positional information of the terminal of the user USR. The data of the drop-off point may be specified by the user USR after the pickup action. The transportation information 442 also includes data of total number of users who use the driverless transportation service at the same time. The transportation information 442 also includes data on an availability of a luggage compartment of the automated drive vehicle 1. Some data included in the transportation information 442 may be used for the chance judgment.

The history information 443 is information indicating usage history of the driverless transportation service. The history information 443 includes past transportation information of the user USR that sent the transportation information 442 to the management server. The history information 443 includes data of the total number of times driverless transportation service has been used. The history information 443 data is used for the chance judgment.

The processor 41 further executes the carriage porch control processing. The carriage porch control processing includes the steering control processing, the acceleration control processing and the deceleration control processing. Hereinafter, the carriage porch control processing according to the first embodiment will be described.

1-2-2. Carriage Porch Control Processing

Figure 9:
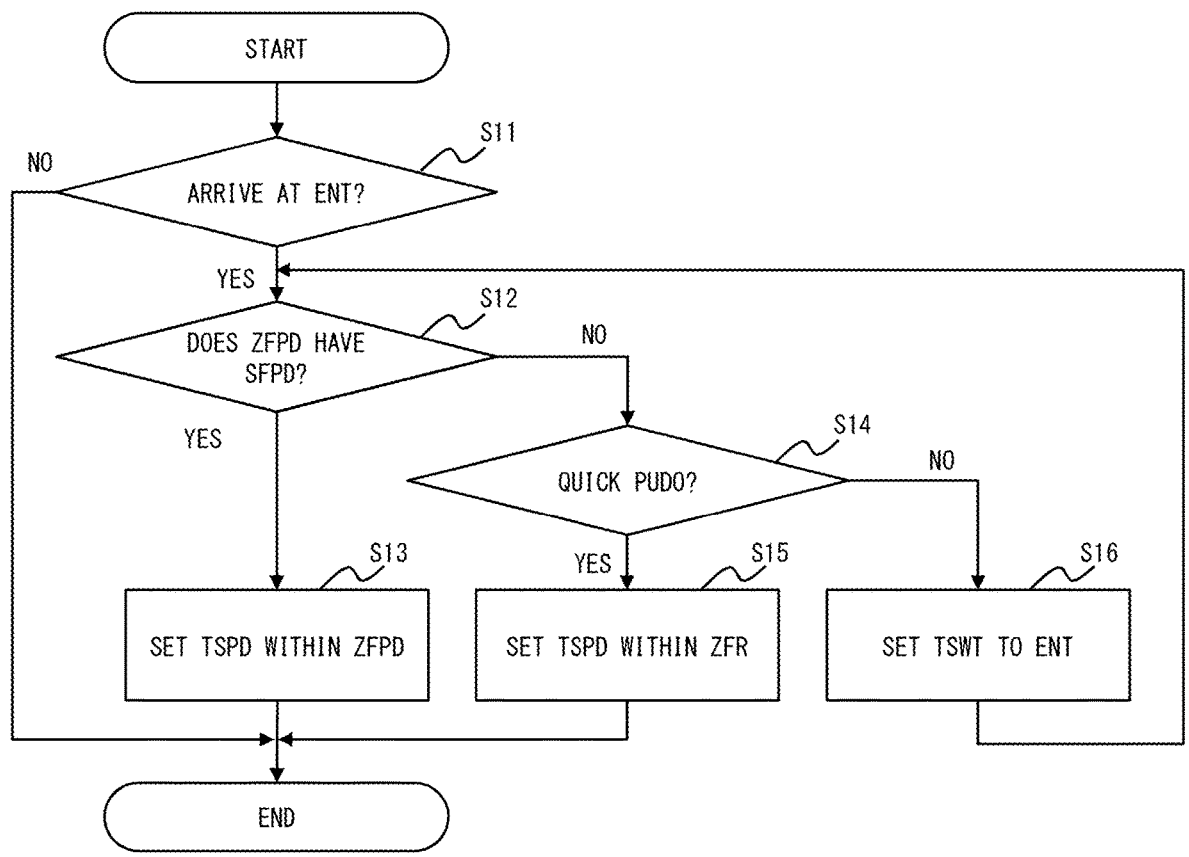
FIG. 9 is a flow chart showing a flow of carriage porch control processing according to the first embodiment.

FIG. 9 is a flow chart showing a flow of the carriage porch control processing according to the first embodiment. It is assumed that driving environment information 43 described in FIG. 7 is updated every predetermined cycles according to another processing flow.

In the routine shown in FIG. 9, the processor 41 judges whether or not the automated drive vehicle 1 has arrived at the entrance ENT (step S11). The location of the automated drive vehicle 1 is specified based on the vehicle positional information 431. The position and range of the carriage porch CRP is specified based on carriage porch information 435. The processor 41 judges whether or not the automated drive vehicle 1 has reached the entrance ENT based on the vehicle positional information 431 and the carriage porch information 435. If judgment result in the step S11 is negative, the processor 41 terminates current processing.

If the judgment result in the step S11 is positive, the processor 41 judges whether or not there is an empty space SFPD in the zone ZFPD (step S12). Status of the carriage porch CRP is specified based on the surrounding circumstances information 433. The range of the carriage porch CRP is specified based on the carriage porch information 435. The processor 41 judges whether or not the zone ZFPD has an empty space SFPD based on the surrounding circumstances information 433 and the carriage porch information 435.

If the judgment result in the step S12 is positive, the processor 41 sets the target position TSPD in the zone ZFPD (step S13). The processor 41 then controls the automated drive vehicle 1 such that the vehicle 1 runs along a travel route from the entrance ENT to the target position TSPD. The processor 41 also controls the automated drive vehicle 1 such that the vehicle 1 perform the PUDO action at the target position TSPD. Thereafter, the processor 41 controls the automated drive vehicle 1 such that the vehicle 1 starts to go toward the exit EXT.

If the judgment result in the step S12 is negative, the processor 41 judges whether or not the quick PUDO is expected (step S14). That is, in the step S14, the chance judgment of the quick PUDO is executed. In the chance judgment, it is judged whether or not the following conditions (i) to (v) are satisfied. For example, if all of these conditions are satisfied, the processor 41 judges that the quick PUDO is expected. Alternatively, if at least one of the conditions (ii) to (v) and also the condition (i) are satisfied, the processor 41 judges that the quick PUDO is expected.

(i) The user USR is not a subject of the priority-seat condition (ii) The user USR does not use the baggage room (iii) The total number of users including the user USR who use the service at the same time is few (e.g., two or less)

(iv) The user USR is accustomed to using the service (v) The user USR does not need to use an umbrella Whether or not the condition (i) is satisfied is judged based on the ID information 441. Whether or not the condition (ii) or (iii) is satisfied is judged based on the transportation information 442. Whether or not the condition (iv) is satisfied is judged based on the history information 443. For example, when the total number of times of usage of the driverless transportation service is equal to or more than a predetermined number (e.g., three times), it is judged that the condition (iv) is satisfied. The condition (v) is judged based on the carriage porch information 435. As the carriage porch information 435 in this case, information as to whether or not the carriage porch CRP has a roof is exemplified.

The condition (iv) may be judged based on combinations of the transportation information 442 and the history information 443. For example, if the pickup point (or the drop-off point) included in the transportation information 442 is also included in the history information 443, it is judged that the condition (iv) is satisfied. The condition (v) may be judged based on weather information (e.g., clear weather or cloudy weather).

In another example of the step S14, the processor 41 predicts a PUDO period based on the user information 44. The PUDO period is calculated, for example, by using a model formula in which individual PUDO periods set according to the conditions (i) to (v) are used as variables. Then, if the predicted PUDO period is less than an allowable period, the processor 41 judges that the quick PUDO is expected. The allowable period is set in advance as a period (e.g., several tens of seconds to one minute) during which the PUDO action in the zone ZFR can be allowed to continue when the zone ZFR assumes that the PUDO action in the zone ZFR has obstructed a passage of other vehicle or a walker. The allowable period may be changed in view of the area of the carriage porch CRP, time zone during which the automated drive vehicle 1 arrived at the entrance ENT, and the like.

If the judgment result in the step S14 is positive, the processor 41 sets the target position TSPD to any position in the zone ZFR (step S15). The processing after setting of the target position TSPD is the same as that in the step S13.

If the judgment result in the step S14 is negative, the processor 41 sets a target position TSWT for performing a waiting motion of the automated drive vehicle 1 to the entrance ENT (step S16). In this case, the automated drive vehicle 1 waits at the entrance ENT until the judgment result in the step S12 becomes positive one in the processing of the next and subsequent routines. That is, the automated drive vehicle 1 waits at the entrance ENT until it is judged that there is the empty space SFPD in the zone ZFPD.

1-3. Effect

According to the first embodiment described above, the chance judgment is performed in the carriage porch control processing when there is no empty space SFPD in the zone ZFPD. And if the result of the chance judgment is positive, the PUDO action of the automated drive vehicle 1 is performed at any position in the zone ZFR. Therefore, even when there is no empty space SFPD in the zone ZFPD, it is possible to perform the PUDO action of the automated drive vehicle 1 while avoiding a situation where the passage of other vehicle or a walker in the carriage porch CRP is obstructed.

2. Second Embodiment

Next, a second embodiment of the present disclosure will be explained with reference to FIGS. 10 to 14. Note that the automated driving method according to the second embodiment is realized by the automated drive system according to the second embodiment. In the following description, a description that overlaps with that of the first embodiment will be omitted as appropriate.

2-1. Outline

In the first embodiment, if the result of the chance judgment is negative, the target position TSWT was set to the entrance ENT. On the other hand, in the second embodiment, if the result of the chance judgment is negative, the target position TSWT is set to a position that differs from the entrance ENT. Several examples of the second embodiment are described below.

2-1-1. First Example

Figure 10:
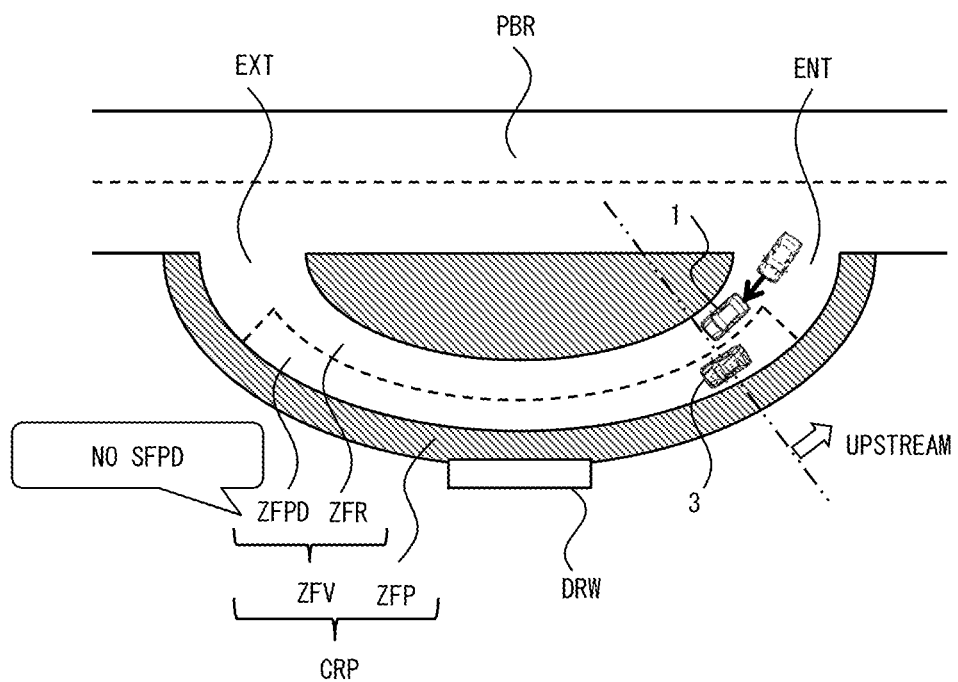
FIG. 10 is a diagram for explaining characteristics of a first example of a second embodiment.

FIG. 10 is a diagram for explaining characteristics of a first example of the second embodiment. As shown in FIG. 10, in the first example, the zone ZFPD has no empty space SFPD. Therefore, the result of the chance judgment becomes negative. In the first example, therefore, a target position TSWT is set within the zone ZFR and at an upstream position of lateral position of a stopping vehicle 3. The stopping vehicle 3 corresponds to the stopping vehicle 2 that stops at a last position (i.e., a most upstream position) of the zone ZFPD.

By setting the target position TSWT in such a location, it is possible for the automated drive vehicle 1 to wait until the empty space SFPD comes out in the zone ZFPD without being stuck in the entrance ENT. In addition, it is possible to avoid hindering a movement of the stopping vehicle 2 (including the stopping vehicle 3) after its start. In addition, it is possible to complete the PUDO action of the automated drive vehicle 1 earlier than the case where the target position TSWT is set to the entrance ENT.

2-1-2. Second Example

Figure 11:
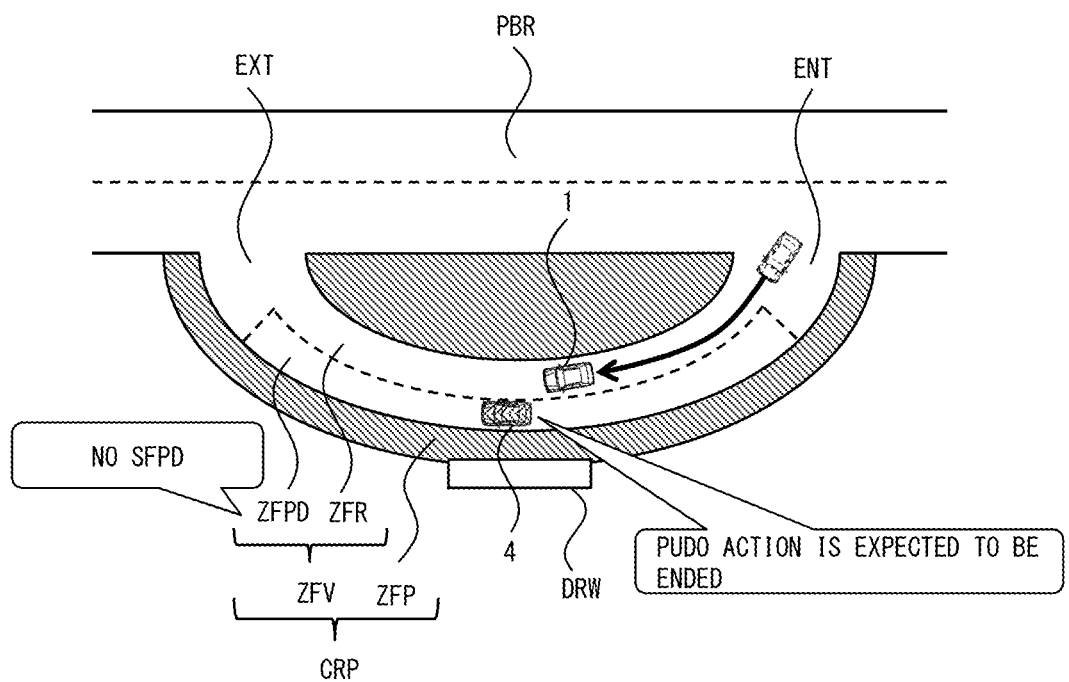
FIG. 11 is a diagram for explaining characteristics of a second example of the second embodiment.

FIG. 11 is a diagram for explaining characteristics of a second example of the second embodiment. Likewise the first example, in the second example, the zone ZFPD has no empty space SFPD. Therefore, the result of the chance judgment becomes negative. In the second example, therefore, if the result of the chance judgment is negative, it is judged whether or not a stopping vehicle 4 is detected. The stopping vehicle 4 corresponds to any one of the stopping vehicle 2 in which the PUDO action is expected to be ended. Hereinafter, for convenience of explanation, the judgment as to whether or not the stopping vehicle 4 is detected is also referred to as a "completion chance judgment". When the result of the completion chance judgment is positive, the target position TSWT is set in the zone ZFR and also at an upstream position of a lateral position of the stopping vehicle 4.

By setting the target position TSWT in such a location, it is possible for the automated drive vehicle 1 to wait until the empty space SFPD comes out in the zone ZFPD without being stuck in the entrance ENT. In addition, it is possible to set the target position TSPD of the automated drive vehicle 1 within the zone ZFPD immediately after the start of the stopping vehicle 4. Therefore, it is possible to complete the PUDO action of the automated drive vehicle 1 earlier than the case where the target position TSWT is set to the entrance ENT.

2-1-3. Third Example

Figure 12:
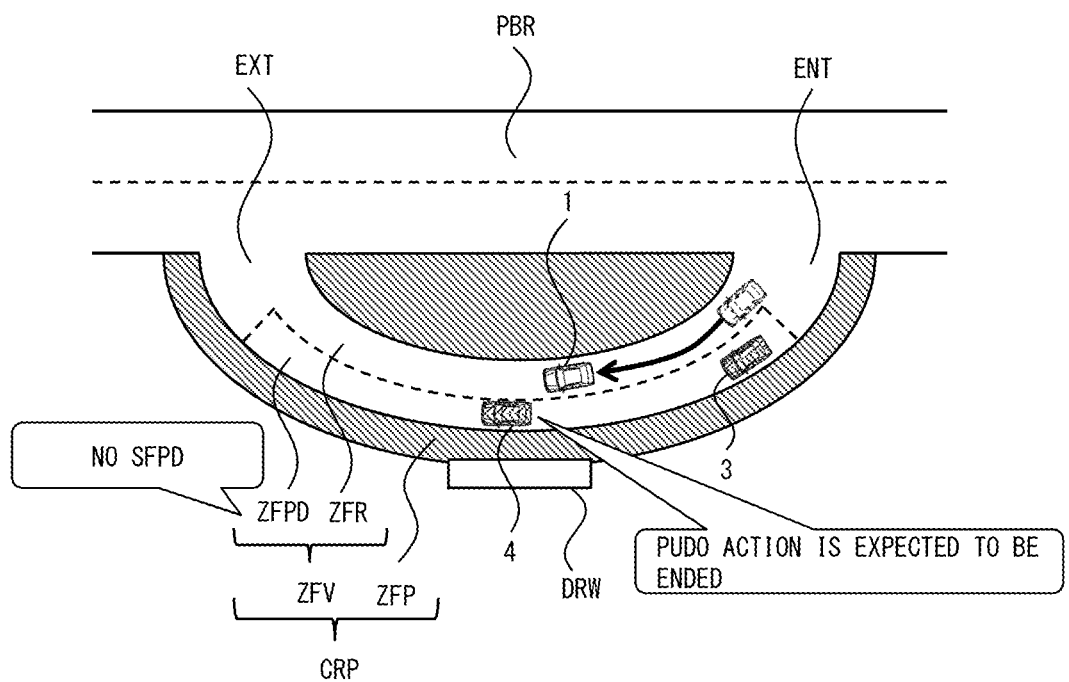
FIG. 12 is a diagram for explaining characteristics of a third example of the second embodiment.

FIG. 12 is a diagram for explaining the characteristics of a third example of the second embodiment. In the third example, the completion chance judgment described in the second example is performed after setting the target position TSWT described in the first example. If the completion chance judgment is positive, the target position TSWT is changed. As described above, in the third example, the target position TSWT may be set twice. However, by setting the target position TSWT in this way, it is possible to obtain the effects of the first and second examples.

2-2. Automated Drive System

2-2-1. First Example of Carriage Porch Control Processing

Figure 13:
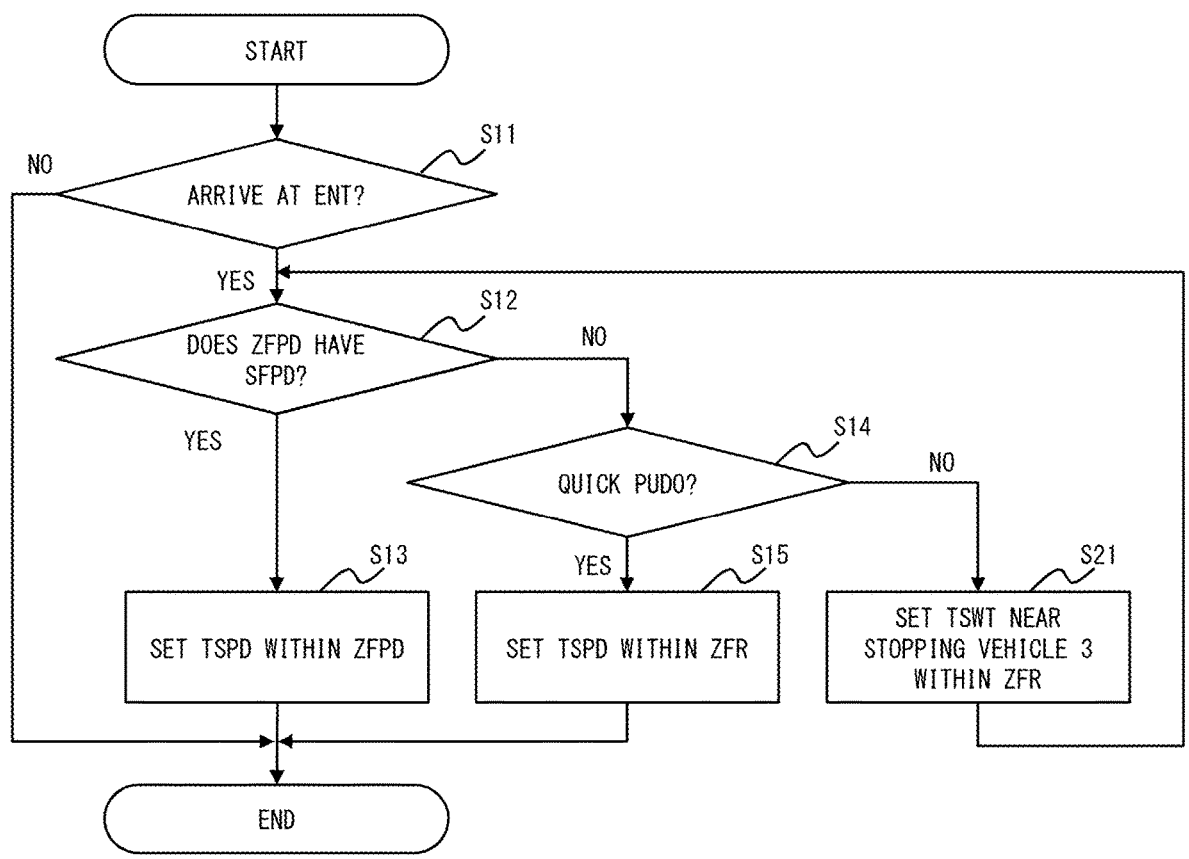
FIG. 13 is a flow chart showing a flow of the carriage porch control processing according to the first example of the second embodiment.

FIG. 13 is a flow chart showing a flow of the carriage porch control processing according to the first example of the second embodiment. The processing flow of the routine shown in FIG. 13 is basically the same as that described in FIG. 9. Therefore, processing executed when the judgment result in the step S14 is negative will be described below.

If the judgment result in the step S14 is negative, the processor 41 sets the target position TSWT in the zone-ZFR and at the upstream position of the lateral position of the stopping vehicle 3 (step S21). The lateral position of the stopping vehicle 3 is set, for example, based on a detected position of a rear or front portion of the stopping vehicle 3. Information of the detected position of the stopping vehicle 3 is included in the surrounding circumstances information 433. Examples of the upstream position of the lateral position of the stopping vehicle 3 include a position away from the lateral position by a predetermined distance (e.g., 1 to 3 m) to the entrance ENT side.

2-2-2. Second Example of Carriage Porch Control Processing

Figure 14:
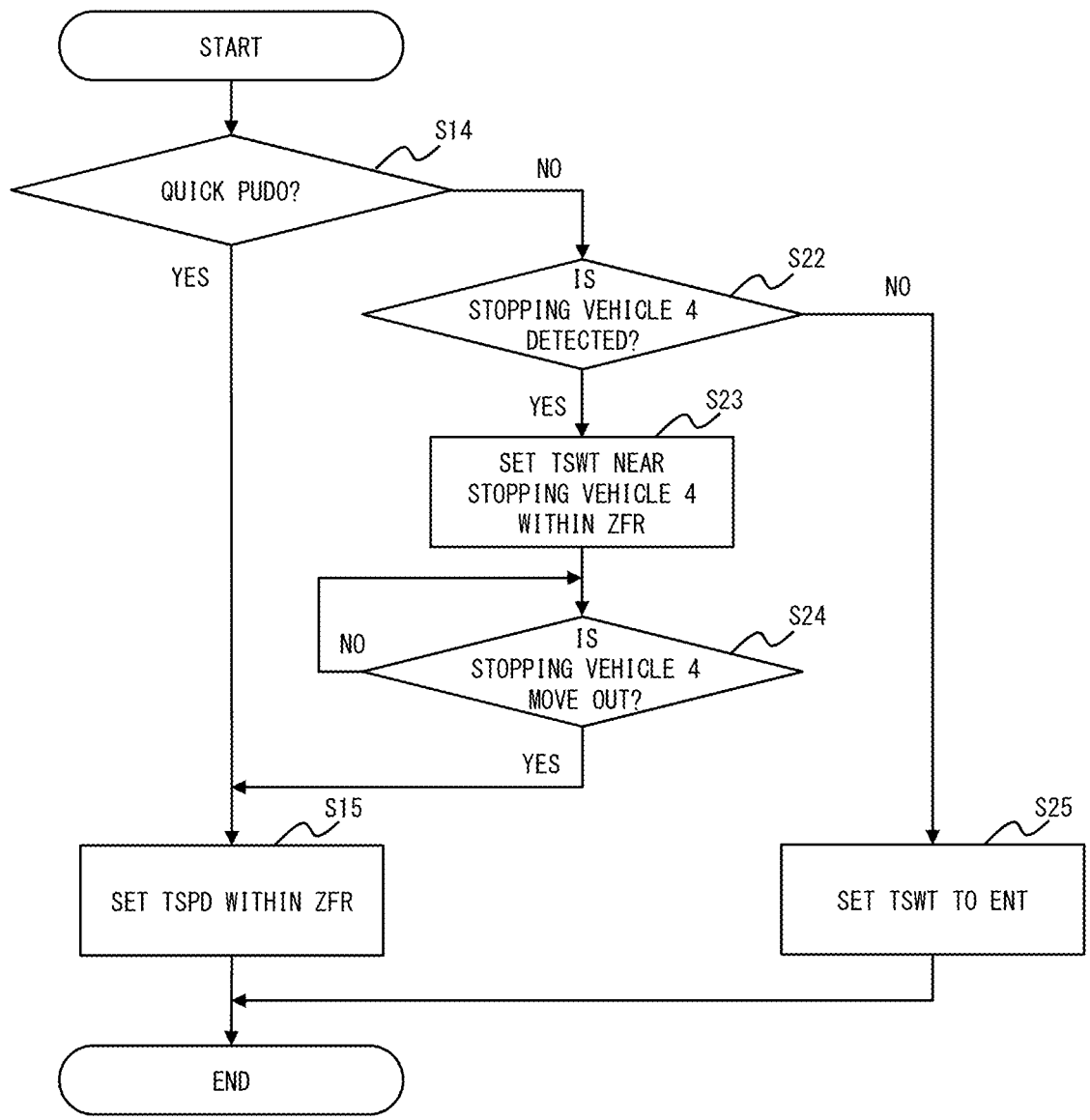
FIG. 14 is a flow chart showing a flow of the carriage porch control processing according to the second example of the second embodiment.

FIG. 14 is a flow chart showing a flow of the carriage porch control processing according to the second example of the second embodiment. The routines shown in FIG. 14 is executed following the step S14 of FIG. 13. The processing from the steps S11 to S13 and the processing S15 are executed as described in FIG. 13.

If the judgment result in the step S14 is negative, the processor 41 judges whether or not the stopping vehicle 4 is detected (step S22). As described above, the stopping vehicle 4 corresponds to the stopping vehicle 2 in which the PUDO action is expected to be ended. For example, if a starting motion of the stopping vehicle 2 is detected, the PUDO action of the same stopping vehicle 2 is expected to be ended. Alternatively, if a lighting motion of a turn signal of the stopping vehicle 2 is detected, the PUDO action of the same stopping vehicle 2 is expected to be ended. Alternatively, if a closing motion of a door of the stopping vehicle 2 is detected, the PUDO action of the same stopping vehicle 2 is expected to be ended. As a further alternative, if a lighting motion of a headlight of the stopping vehicle 2 is detected at night, the PUDO action of the same stopping vehicle 2 is expected to be ended. Information of the various motions is included in the surrounding circumstances information 433. For detecting the various motions, for example, a judgment model is used which is constructed based on a characteristic quantity of the picture information.

If the judgment result in the step S22 is positive, the processor 41 sets the target position TSWT in the zone ZFR and at the upstream position of the lateral position of the stopping vehicle 4 (step S23). The setting examples of the lateral position of the stopping vehicle 4 are the same as those of the stopping vehicle 3 described in FIG. 13.

Subsequent to the step S23, the processor 41 judges whether or not the stopping vehicle 4 has moved out of the zone ZFPD (step S24). The movement of the stopping vehicle 4 is judged based on a detected position of a rear or front portion of the stopping vehicle 4. Information of the detected position of the stopping vehicle 4 is included in the surrounding circumstances information 433. If the detected position of the stopping vehicle 4 is outside the zone ZFPD, the processor 41 judges that the stopping vehicle 4 has moved outside the zone ZFPD.

If the judgment result in the step S24 is positive, the processor 41 performs the processing in the step S15. The processing of the step S15 is as described in FIG. 9.

If the judgment result in the step S22 is negative, the processor 41 executes the processing in the step S25. The processing of the step S25 is the same as the processing of step S16 described in FIG. 9.

2-2-3. Third Example of Carriage Porch Control Processing

As for the flow of the carriage porch control processing relating to the third example of the second embodiment, the descriptions of FIGS. 13 and 14 are appropriately incorporated. Specifically, the processor 41 executes the processing after the step S22 described in FIG. 14 following the processing of the step S21 described in FIG. 13. This explains the flow of the carriage porch control processing according to third example.

2-3. Effect

According to the second embodiment described above, in the carriage porch control processing, the target position TSWT is set in the zone ZFR and at the different position from the entrance ENT. Therefore, it is possible for the automated drive vehicle 1 to wait until the empty space SFPD comes out in the zone ZFPD without being stuck in the entrance ENT.

In addition, according to the first example, it is possible to avoid hindering a movement of the stopping vehicle 2 (including the stopping vehicle 3) after its start. Further, according to the first example, it is possible to complete the PUDO action of the automated drive vehicle 1 earlier than the case where the target position TSWT is set to the entrance ENT. The same is true for the second example in this regard. That is, according to the second example, it is possible to start the PUDO action of the automated drive vehicle 1 immediately after the start of the stopping vehicle 3 in which the PUDO action is expected to be ended. And thus, it is possible to complete the PUDO action of automated drive vehicle 1 earlier. This leads to an improvement in a convenience of the driverless transportation service. According to third example, it is possible to obtain the first and second examples of the second embodiment.

3. Third Embodiment

Next, a third embodiment of the present disclosure will be explained with reference to FIGS. 15 to 17. Note that the automated driving method according to the third embodiment is realized by the automated drive system according to the second embodiment. In the following description, a description that overlaps with that of the first and/or second embodiment will be omitted as appropriate.

3-1. Outline

In the first and second embodiments, if the result of the chance judgment is negative, the target position TSWT was set. In addition, the completion chance judgment was carried out when the target position TSWT was set. In the third embodiment, on the other hand, it is judged whether or not a following vehicle is detected after the target position TSWT is set. The following vehicle is a vehicle behind the automated drive vehicle 1 of which an approaching motion to the zone ZFR is detected by the automated drive vehicle 1. Hereinafter, for convenience of explanation, the judgment as to whether or not the following vehicle is detected is also referred to as a "following vehicle judgment". Several examples of the third embodiment are described below.

3-1-1. First Example

Figure 15:
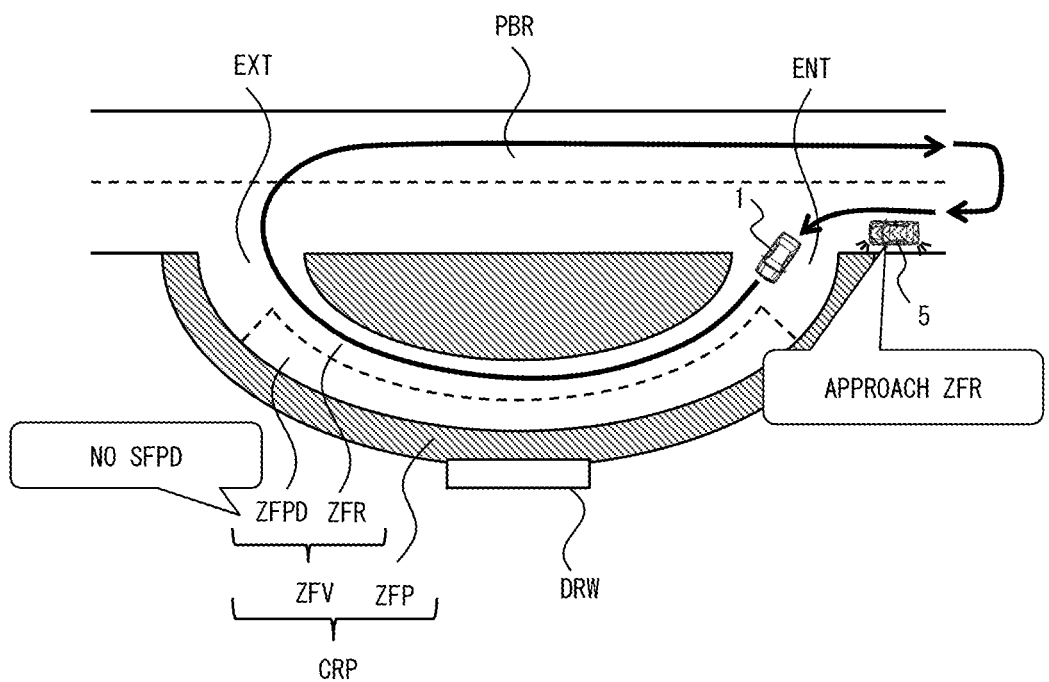
FIG. 15 is a diagram for explaining characteristics of a first example of a third embodiment.

FIG. 15 is a diagram for explaining the characteristics of a first example of third embodiment. As shown in FIG. 15, in the first example, the zone ZFPD has no empty space SFPD. Therefore, the result of chance judgment becomes negative. This assumption is the same as that of the third example 1 of the second embodiment.

In the first example shown in FIG. 15, the target position TSWT is set to the entrance ENT. In the first example, further, the following vehicle 5 is detected by the automated drive vehicle 1. Therefore, the result of the following vehicle judgment becomes positive. In the first example, a travel route is set which temporarily passes through the carriage porch CRP and returns to the carriage porch CRP. The travel route also includes a route on the public road PBR. By setting such the travel route, it is possible for the automated drive vehicle 1 to wait until the empty space SFPD comes out in the zone ZFPD while avoiding the situation in which the following vehicle 5 approaching the zone ZFR is prevented from passing the zone ZFR.

3-1-2. Second Example

It is assumed that an object of the approaching motion of the following vehicle 5 is the PUDO action in the carriage porch CRP. Therefore, in the second example of the third embodiment, when the result of the following vehicle judgment is positive, it is judged whether or not a short waiting of the automated drive vehicle 1 is expected. The "short waiting" means that a duration of the waiting motion of the automated drive vehicle 1 ends in a short time. Hereinafter, for convenience of explanation, the judgment as to whether or not the short waiting is expected is also referred to as a "short waiting judgment".

The short waiting judgment is performed based on whether or not the stopping vehicle 4 described in FIG. 11 is detected. As described above, the stopping vehicle 4 corresponds to any one of the stopping vehicle 2 in which the PUDO action is expected to be ended. Therefore, the fact that stopping vehicle 4 is detected means that the PUDO action of the automated drive vehicle 1 is expected to start in the near future. If so, it is more efficient to wait for this future PUDO action opportunity than to go through the carriage porch CRP once, as in the first example described in FIG. 15. Therefore, in the second example, if the result of the short waiting judgment is positive, the target position TSWT is retained. By retaining the target position TSWT, it is possible for the automated drive vehicle 1 to wait for the empty space SFPD in the zone ZFPD while minimizing the disruption to the following vehicle 5 approaching the zone ZFR.

3-2. Automated Drive System

3-2-1. First Example of Carriage Porch Control Processing

Figure 16:
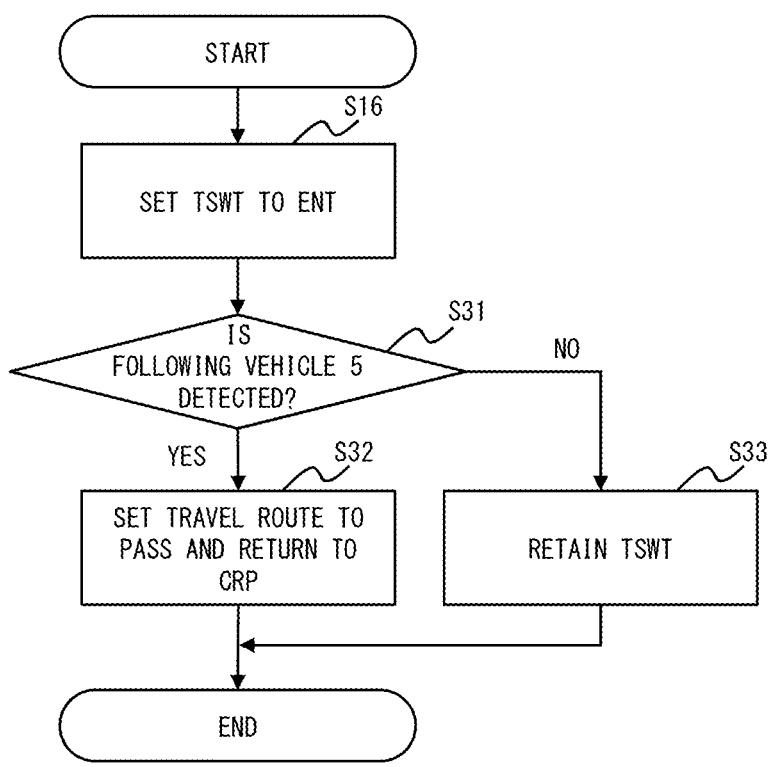
FIG. 16 is a flow chart showing a flow of the carriage porch control processing according to the first example of the third embodiment.

FIG. 16 is a flow chart showing a flow of the carriage porch control processing according to the first example of the third embodiment. The routines shown in FIG. 16 is executed following the processing of the step S16 of FIG. 9. Note that the processing from the steps S11 to S15 is executed as described in FIG. 9. In addition, the routine shown in FIG. 16 may be executed following the processing of the step S21 of FIG. 13 or the processing of the step S25 of the FIG. 14.

Subsequent to the step S16, the processor 41 judges whether or not the following vehicle 5 is detected (step S31). As described above, the following vehicle 5 is the vehicle that performs the approaching motion to the ZFR behind the automated drive vehicle 1. The detection of the following vehicle 5 is, for example, based on an inter-vehicular distance between the automated drive vehicle 1 and the following vehicle 5. In another example, if a vehicle which turns on a turn signal in a direction approaching the carriage porch CRP is detected by the automated drive vehicle 1, the same vehicle is recognized as the following vehicle 5. Information of the inter-vehicular distance is calculated separately based on the surrounding circumstances information 433. For the detection of the lighting motion of the turn signal, for example, the judgment model mentioned above is used.

If the judgment result in the step S31 is positive, the processor 41 sets the travel route (step S32). This travel route is a path that temporarily passes through the carriage porch CRP and returns to the carriage porch CRP. The processor 41 controls the automated drive vehicle 1 such that the automated drive vehicle 1 runs according to this travel route. The processing executed after the automated drive vehicle 1 reaches the entrance ENT is described in FIG. 9.

If the judgment result in the step S31 is negative, the processor 41 retains the target position TSWT (step S33). That is, when the processing in the step S33 is executed, the entrance ENT continues to be set as the target position TSWT.

3-2-2. Second Example of Carriage Porch Control Processing

Figure 17:
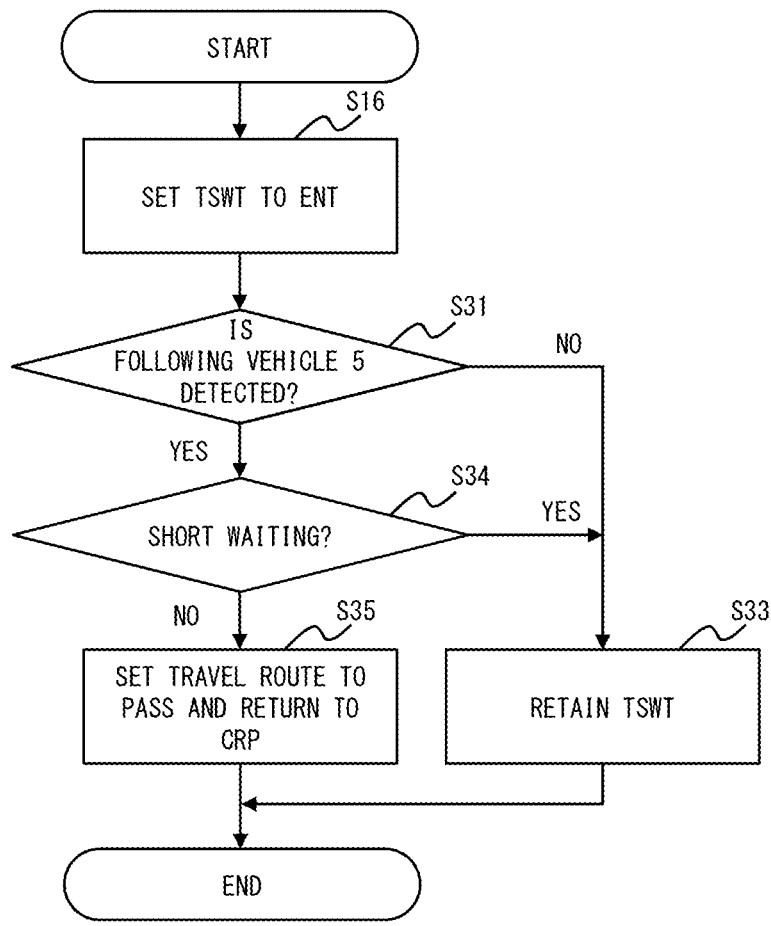
FIG. 17 is a flow chart showing a flow of the carriage porch control processing according to a second example of the third embodiment.

FIG. 17 is a flow chart showing a flow of the carriage porch control processing according to a second example of the third embodiment. The processing flow of the routine shown in FIG. 17 is basically the same as that described in FIG. 16. Therefore, the processing executed when the judgment result in the step S31 is positive will be described below.

If the judgment result in the step S31 is positive, the processor 41 judges whether or not the short waiting is expected (step S34). The processing of the step S34 is the same as that of the step S22 described in FIG. 14. That is, in the step S34, it is judged whether or not the stopping vehicle 4 is detected. If the judgment result in the step S34 is negative, the processing in the step S35 is executed. The processing in the step S35 is the same as that of the step S32 described in FIG. 16.

3-3. Effect

According to third embodiment described above, in the carriage porch control processing, the following vehicle judgment is performed after the target position TSWT is set. And, according to the first example, when the result of the following vehicle judgment is positive, the travel route which temporarily passes through the carriage porch CRP and returns to the carriage porch CRP is set. Therefore, it is possible to wait until empty space SFPD comes out in the zone ZFPD while avoiding the situation in which the passage of the following vehicle 5 approaching the zone ZFR is obstructed.

On the other hand, according to the second example, when the result of the following vehicle judgment is positive, the short waiting judgment is performed. If the result of the short waiting judgment is positive, then the target position TSWT is retained. Otherwise, the travel route described in the first example is set. Therefore, it is possible for the automated drive vehicle 1 to wait for the empty space SFPD in the zone ZFPD while minimizing the disruption to the following vehicle 5 approaching the zone ZFR. Also, it is possible to prevent the user USR who waits for the PUDO action of the automated drive vehicle 1 from feeling of a strangeness when the automated drive vehicle 1 passes through the carriage porch CRP. This leads to an improvement in the convenience of the driverless transportation service.

What is claimed is:

1. An automated drive system that is configured to control an automated drive vehicle provided to a driverless transportation service,
wherein the automated drive system comprises:
one or more sensors configured to obtain user information and driving environment information, wherein:
the user information indicates information on a user of the driverless transportation service; and
the driving environment information indicates information on a driving environment of the automated drive vehicle,
a processor which is configured to perform run control processing of the automated drive vehicle based on the user information and the driving environment information,
wherein the run control processing includes carriage porch control processing that is performed when a pick up and/or drop off position of the user corresponds to a carriage porch of a facility including a first zone and a second zone, wherein the first zone is further from a curb than the second zone,
wherein, in the carriage porch control processing, the processor is configured to:
judge whether or not the second zone has an empty space;
if it is judged that there is no empty space, based on the user information, judge whether or not a quick pick-up and/or drop-off in the carriage porch of the user is expected based on whether the user is not a subject of a priority-seat condition, whether the user does not use a baggage room, whether a total number of users using the driverless transportation service at a same time is two or less, whether the user is accustomed to using the driverless transportation service, and whether the user does not need to use an umbrella; and
if it is judged that the quick pick-up and/or drop-off is expected, set a target pick-up and/or drop-off position to perform a pick-up and/or drop-off action of the automated drive vehicle at any position within the first zone.

2. The automated drive system according to claim 1,
wherein, in the carriage porch control processing, the processor is further configured to,
if it is judged that the quick pick-up and/or drop-off is not expected, set a target waiting position for waiting for the pick-up and/or drop-off action of the automated drive vehicle within the first zone,
wherein the target waiting position is located behind a stopping vehicle stopping at a last position of the second zone.

3. The automated drive system according to claim 2,
wherein, in the carriage porch control processing, the processor is further configured to:
judge, based on the driving environment information, whether or not the pick-up and/or drop-off action of the stopping vehicle is expected to be ended; and
if it is judged that the pick-up and/or drop-off action of the stopping vehicle is expected to be ended, change the target waiting position to a positon within the same lane and behind the position of the stopping vehicle.

4. The automated drive system according to claim 2,
wherein, in the carriage porch control processing, the processor is further configured to:
if it is judged that the quick pick-up and/or drop-off is not expected, based on the driving environment information, judge whether or not the pick-up and/or drop-off action of the stopping vehicle is expected to be ended; and
if it is judged that the pick-up and/or drop-off action of the stopping vehicle is expected to be ended, set a target waiting position for waiting for the pick-up and/or drop-off action of the automated drive vehicle within the first zone,
wherein the target waiting position locates at a position within the same lane and behind the position of the stopping vehicle.

5. The automated drive system according to claim 2,
wherein, in the carriage porch control processing, the processor is further configured to:
after the setting of the target waiting position, based on the driving environment information, judge whether or not an approaching motion of a following vehicle of the automated drive vehicle to the first zone is recognized; and
if it is judged that the approaching motion is recognized, set a travel route for temporarily passing through the carriage porch and returning to the carriage porch.

6. The automated drive system according to claim 2,
wherein, in the carriage porch control processing, the processor is further configured to:
after the setting of the target waiting position, based on the driving environment information, judge whether or not an approaching motion of a following vehicle of the automated drive vehicle to the first zone is recognized;
if it is judged that the approaching motion is recognized, judge whether or not a duration of waiting of the automated drive vehicle in the target waiting position is expected to be less than a threshold waiting time; and
if it is judged that the duration of waiting of the automated drive vehicle in the target waiting position is expected to be less than the threshold waiting time, retain the target waiting position.

7. The automated drive system according to claim 6,
wherein, in the carriage porch control processing, the processor is further configured to,
if it is judged that the duration of waiting of the automated drive vehicle in the target waiting position is not expected to be less than the threshold waiting time, set a travel route for temporarily passing through the carriage porch and returning to the carriage porch.

8. The automated drive system according to claim 1,
wherein the target pick-up and/or drop-off position is a position closest to a doorway of the facility, within the first zone, leading to the second zone.

9. The automated drive system according to claim 1,
wherein the target pick-up and/or drop-off position is in a first lane adjacent to a second lane containing at least two stopping vehicles.

10. An automated driving method to control an automated drive vehicle provided to a driverless transportation service, wherein the automated driving method comprises the steps of:

obtaining user information indicating information on a user of the driverless transportation service and driving environment information indicating information on a driving environment of the automated drive vehicle; and executing run control processing of the automated drive vehicle based on the user information and the driving environment information, wherein the run control processing includes carriage porch control processing that is executed when a pick up and/or drop off position of the user corresponds to a carriage porch of a facility including a first zone and a second zone, wherein the first zone is further from a curb than the second zone, wherein the carriage porch control processing includes the steps of:

judging whether or not the second zone has an empty space;

if it is judged that there is no empty space, based on the user information, judging whether or not a quick pick-up and/or drop-off in the carriage porch of the user is expected based on whether the user is not a subject of a priority-seat condition, whether the user does not use a baggage room, whether a total number of users using the driverless transportation service at a same time is two or less, whether the user is accustomed to using the driverless transportation service, and whether the user does not need to use an umbrella; and if it is judged that the quick pick-up and/or drop-off is expected, setting a target pick-up and/or drop-off position to perform a pick-up and/or drop-off action of the automated drive vehicle at any position within the first zone.

11. The automated driving method according to claim 10, wherein the carriage porch control processing further includes the step of, if it is judged that the quick pick-up and/or drop-off is not expected, setting a target waiting position for waiting for the pick-up and/or drop-off action of the automated drive vehicle within the first zone, wherein the target waiting position is located behind a lateral position of a stopping vehicle stopping at a last position of the second zone.

12. The automated driving method according to claim 11, wherein the carriage porch control processing further includes the steps of:

judging, based on the driving environment information, whether or not the pick-up and/or drop-off action of the stopping vehicle is expected to be ended; and if it is judged that the pick-up and/or drop-off action of the stopping vehicle is expected to be ended, changing the target waiting position to a positon within the same lane and behind the position of the stopping vehicle.

13. The automated driving method according to claim 11, wherein the carriage porch control processing further includes the steps of:

if it is judged that the quick pick-up and/or drop-off is not expected, based on the driving environment information, judging whether or not the pick-up and/or drop-off action of the stopping vehicle is expected to be ended; and if it is judged that the pick-up and/or drop-off action of the stopping vehicle is expected to be ended, setting a target waiting position for waiting for the pick-up and/or drop-off action of the automated drive vehicle within the first zone, wherein the target waiting position locates at a position within the same lane and behind the position of the stopping vehicle.

14. The automated driving method according to claim 11, wherein the carriage porch control processing further includes the steps of:

after the setting of the target waiting position, based on the driving environment information, judging whether or not an approaching motion of a following vehicle of the automated drive vehicle to the first zone is recognized; and if it is judged that the approaching motion is recognized, setting a travel route for temporarily passing through the carriage porch and returning to the carriage porch.

15. The automated driving method according to claim 11, wherein the carriage porch control processing further includes the steps of:

after the setting of the target waiting position, based on the driving environment information, judging whether or not an approaching motion of a following vehicle of the automated drive vehicle to the first zone is recognized;

if it is judged that the approaching motion is recognized, judging whether or not a duration of waiting of the automated drive vehicle in the target waiting position is expected to be less than a threshold waiting time; and if it is judged that the duration of waiting of the automated drive vehicle in the target waiting position is expected to be less than the threshold waiting time, retaining the target waiting position.

16. The automated driving method according to claim 15, wherein the carriage porch control processing further includes the step of, if it is judged that the duration of waiting of the automated drive vehicle in the target waiting position is not expected to be less than the threshold waiting time, setting a travel route for temporarily passing through the carriage porch and returning to the carriage porch.

17. The automated driving method according to claim 10, wherein the target pick-up and/or drop-off position is a position closest to a doorway of the facility, within the first zone, leading to the second zone.

18. The automated driving method according to claim 10, wherein the target pick-up and/or drop-off position is in a first lane adjacent to a second lane containing at least two stopping vehicles.

* * * * *